United States Patent [19]

Cunningham

[11] 4,163,321
[45] Aug. 7, 1979

[54] METHOD FOR SEQUENCING THE CUTTING OF ELONGATED STOCK

[75] Inventor: John P. Cunningham, Raleigh, N.C.

[73] Assignee: Barr-Mullin, Inc., Raleigh, N.C.

[21] Appl. No.: 844,493

[22] Filed: Oct. 21, 1977

[51] Int. Cl.² .................... G06F 15/46; G05B 13/00
[52] U.S. Cl. ...................................... 33/1 S; 364/475
[58] Field of Search ................ 33/1 S, 1 G; 364/468, 364/475, 552, 554, 564

[56] References Cited

U.S. PATENT DOCUMENTS

| 3,242,573 | 3/1966 | Noel | 33/1 G |
|---|---|---|---|
| 3,490,147 | 1/1970 | Brichard et al. | 33/1 S |
| 3,931,501 | 1/1976 | Barr et al. | 364/475 |
| 4,017,976 | 4/1977 | Barr et al. | 33/1 S |

Primary Examiner—Richard R. Stearns
Attorney, Agent, or Firm—Mason, Fenwick & Lawrence

[57] ABSTRACT

A method for sequencing the cutting of elongated stock such as boards of lumber having random unusable lengths containing knots, discoloration or the like for reducing waste when cutting a mix or mixture of different grades of lumber into furniture parts by making optimum selection of parts to be cut concurrently, the method including the steps of establishing the required lengths, board footage and quantities of pieces of each length to be cut, determining a value factor for each desired length, determining waste factors for all possible combinations of lengths, establishing the probability of having a given length of usable stock in each of the grades of stock being processed, determining from said required lengths, required quantities, required board footage, value factors, probabilities, grade mix and waste factors, the combination of parts to be cut at one time which results in the lowest waste for the entire cutting.

2 Claims, 3 Drawing Figures

METHOD FOR SEQUENCING THE CUTTING OF ELONGATED STOCK

The present invention relates in general to a method for sequencing the cutting of elongated stock such as boards of lumber having random unusable lengths containing knots, discolorations, or the like for reducing waste when cutting a mix or mixture of different grades of lumber into furniture parts.

In the prior art, particularly in lumber processing, the foreman of the cutting operation has selected those parts of the same lumber species and thickness, from the parts requirement list, which he feels should be cut concurrently to minimize the quantity of clear lumber which is wasted. Unfortunately, in the furniture industry, the parts requirement list is seldom repeated over a period of time thereby making it very difficult to select an optimum cutting sequence based on previous experience. Prior to the present invention, rough-mill operators have had to rely solely on their past experience in determining the best selection of parts to be cut concurrently for the various grade mixes of materials being processed and for the particular billing requirement being satisfied.

The present invention permits minimizing the waste of usable lumber or other types of stock for various grade mixes and required lengths and widths without any trial and error. The present invention, as used with a mini-computer and a print-out terminal, provides a method for sequencing the cutting of elongated stock wherein the cross-cut saw operator has only to input the grade mix of lumber being processed, the length, width and quantity of the required parts and the production priority of the required part relative to other parts of the same species and thickness to be cut. Almost immediately the computer will print out the sequence of elongated stock to be cut to produce minimum waste of usable stock.

Accordingly, it is the principle object of the present invention to provide a novel method for sequencing the cutting of elongated stock to minimize waste.

Another object of the present invention is to provide such a novel method which reduces waste when cutting lumber into furniture parts by making an optimum selection of the appropriate parts to be cut concurrently.

A further object of the present invention is to provide a novel method for sequencing the cutting of elongated stock to reduce the time necessary for a rough-mill foreman to select the best sequence of cutting the stock in order to satisfy a required parts list.

An additional object of the present invention is to provide a novel method which minimizes the waste of usable lumber from a cutting operation by eliminating errors in human judgment.

A further object of the present invention is to provide a novel method of scheduling the parts to be cut from a mix or mixture of different grades of lumber to satisfy a master list of required parts to systematically select the initial combination and subsequent combination of parts to be cut concurrently in such a manner as to minimize the waste of usable lumber.

Another object of the present invention is to provide a novel method for sequencing the cutting of elongated stock to reduce the material costs in the fabrication of furniture.

A further object of the present invention is to conserve the natural resources by requiring fewer trees to provide the necessary lumber.

Other objects and advantages of the invention will become more apparent to those persons having ordinary skill in the art to which the present invention pertains from the following description taken in conjunction with the accompanying drawings wherein.

Figure 1:
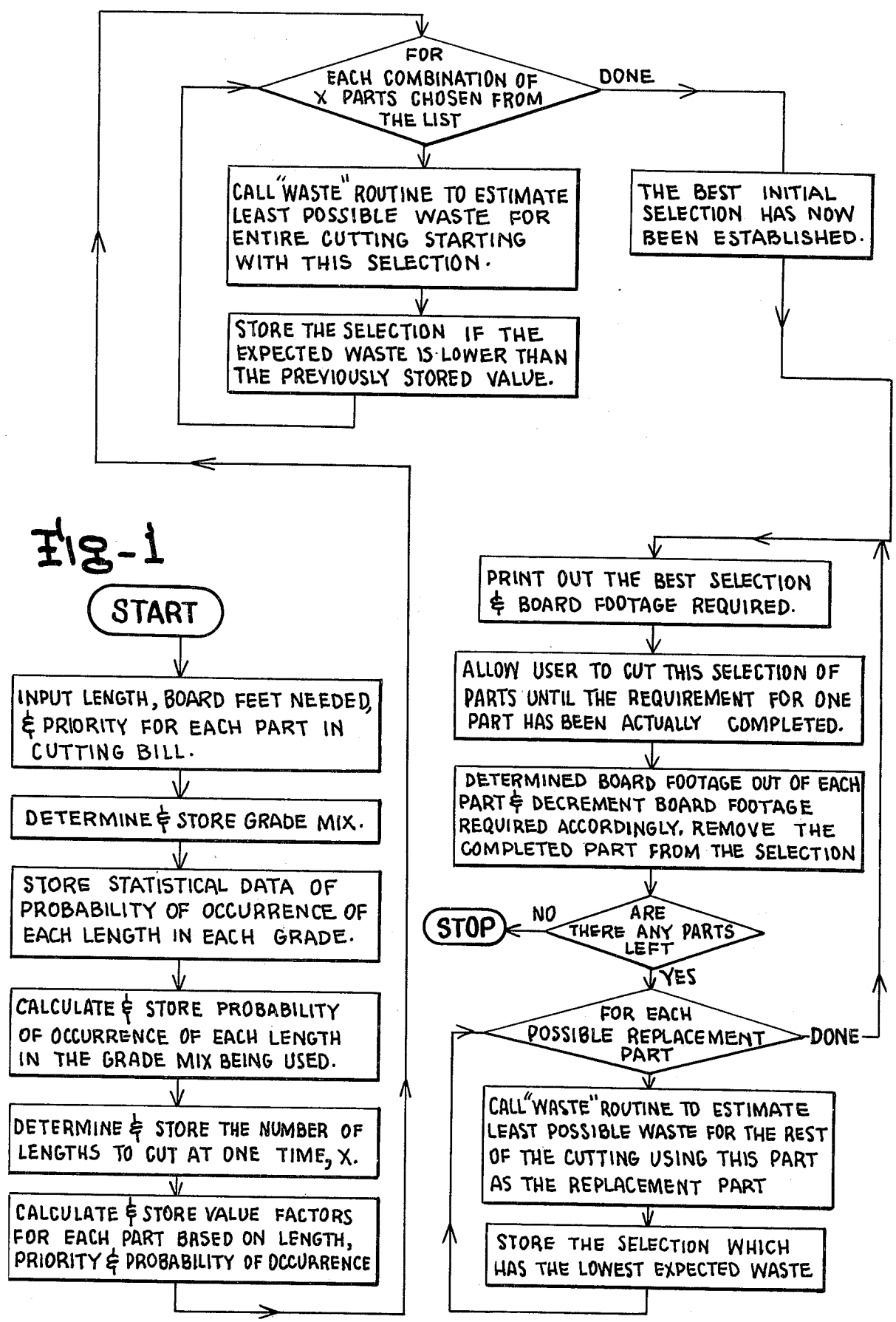
FIG. 1 is the main flow diagram of a computer program for practicing the preferred embodiment of the present invention.
Figure 2:
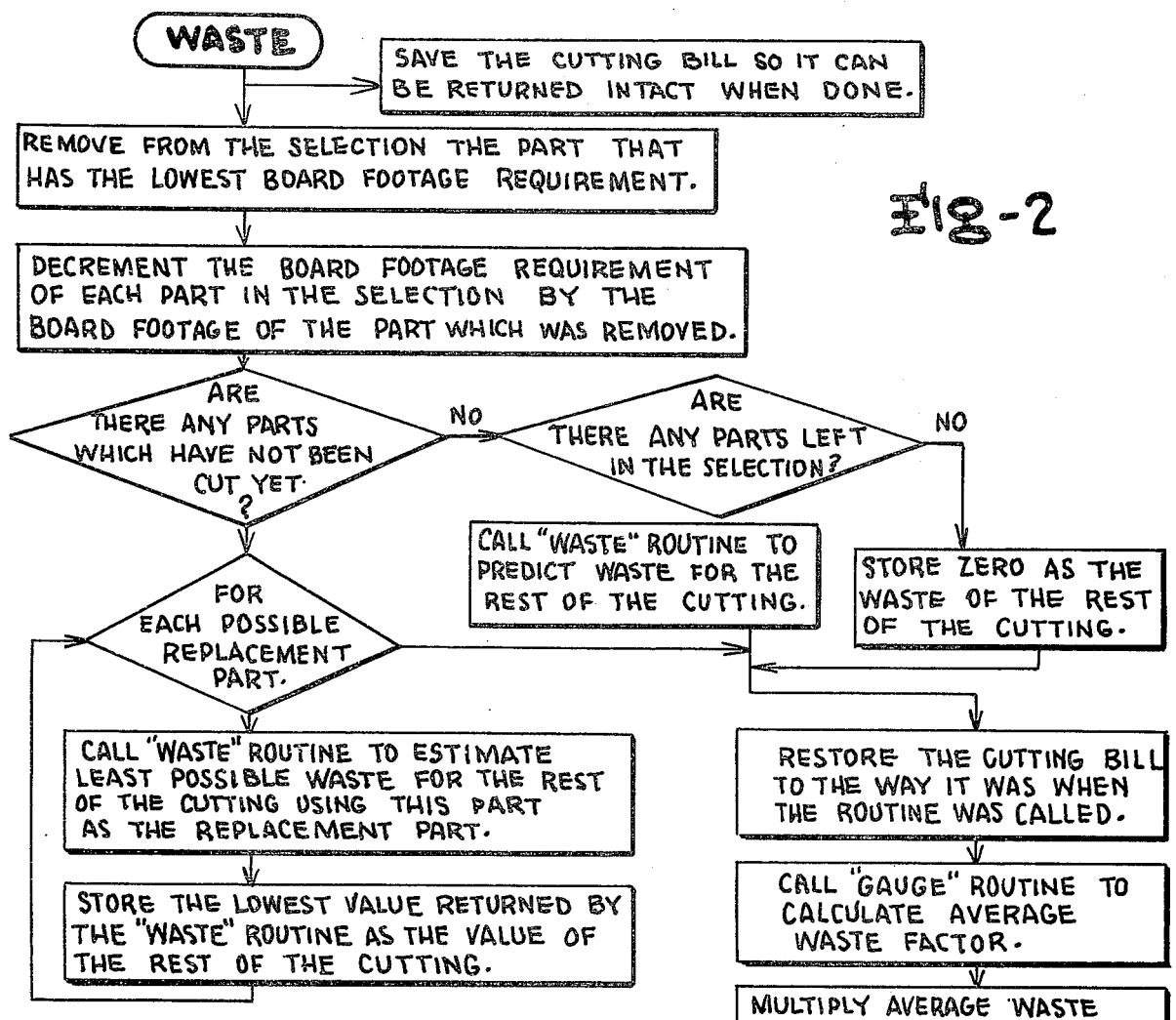
FIG. 2 is a flow diagram of the Waste subroutine of the main flow diagram of FIG. 1.
Figure 3:
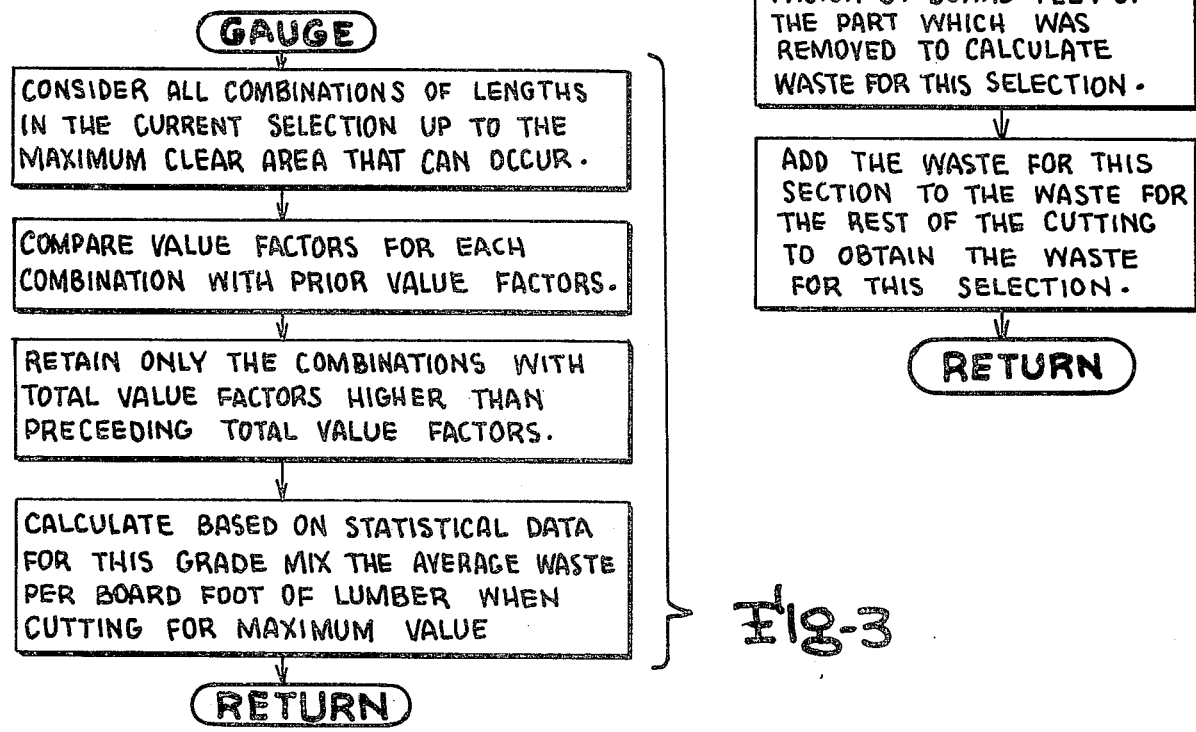
FIG. 3 is a flow diagram of the Gauge subroutine of the Waste subroutine of FIG. 2.

The preferred embodiment of the method of the present invention as applied to a computer includes the steps shown in the block diagram in FIGS. 1, 2 and 3.

A listing of the instructions of a specific computer program written in BASIC programming language for use under the RT-11 operating system on Digital Equipment Corporation's PDP 11 computers is shown below which conforms to the flow diagram illustrated in FIGS. 1, 2 and 3.

```
100 REM
101 REM
102 REM ---- PROGRAM TO SCHEDULE LENGTHS TO CUT
103 REM
104 REM
110 DIM L(100), B(100), P(100), V(100), F(100)
120 DIM Y(960), Z(960)
1000 REM
1001 REM ---- DETERMINE AND STORE CUTTING BILL
1002 REM
1010 PRINT 'INPUT LENGTH, BOARD FEET, AND PRIORITY'
1020 N=N+1
1030 INPUT L(N), B(N), P(N)
1040 L(N)=L(N)*8
1050 IF L(N)<>0 THEN 1020
1060 N=N-1
1100 REM
1101 REM ---- DETERMINE AND STORE GRADE MIX
1102 REM
1110 PRINT 'INPUT GRADE MIX (%FAS, %SELECT, %1 COMMON, %2 COMMON)'
1120 INPUT G1,G2,G3,G4
1130 IF ABS(G1+G2+G3+G4−1)<1.00000E−04 THEN 1200
1140 PRINT 'SUM MUST BE 1.'
1150 GO TO 1100
1200 REM
```

```
1201 REM ---- CALCULATE STATISTICAL DATA FOR THIS GRADE MIX
1202 REM      BASED ON THE STATISTICAL DATA FOR EACH GRADE MIX
1203 REM
1210 OPEN "DATA" FOR INPUT AS FILE #1
1220 FOR I=0 TO 960
1230 INPUT #1:Y1,Y2,Y3,Y4
1240 Y(I)=G1*Y1+G2*Y2+G3*Y3+G4*Y4
1250 NEXT I
1300 REM
1301 REM ---- CALCULATE VALUE FACTORS FOR EACH LENGTH
1302 REM      BASED ON STATISTICAL DATA AND PRIORITIES
1303 REM
1310 FOR I=1 TO N
1320 V(I)=L(I)*P(I)/Y(L(I))
1330 NEXT I
1400 REM
1401 REM ---- INPUT NUMBER OF LENGTHS TO CUT AT ONE TIME
1402 REM
1410 PRINT 'INPUT NUMBER OF LENGTHS TO CUT'
1420 INPUT X
2000 REM
2001 REM ---- MAKE INITIAL SELECTION
2002 REM
2010 B=1.00000E+25
2020 GOSUB 8000 /REM NEXT COMBINATION
2030 IF N1=0 THEN 2500
2040 IF N1<>X THEN 2020
2050 GOSUB 5000
2060 IF W(1)>=B THEN 2020
2070 B=W(1)
2080 FOR I=1 TO N
2090 M(I)=F(I)
2100 NEXT I
2110 GO TO 2020
2500 PRINT 'LENGTHS TO CUT:'
2510 FOR I=1 TO N
2520 F(I)=M(I)
2525 IF F(I)<>1 THEN 2540
2530 PRINT L(I)/8;
2540 NEXT I
2550 PRINT /PRINT
3000 REM
3001 REM ---- SELECT REPLACEMENT PARTS
3002 REM
3010 PRINT 'INPUT BOARD FEET COMPLETED FOR EACH LENGTH:'
3020 FOR I=1 TO N
3030 IF F(I)<>1 THEN 3070
3040 PRINT L(I)/8;'(';STR$(B(I));')';
3050 INPUT B
3060 B(I)=B(I)-B
3070 NEXT I
3100 FOR I=1 TO N
3110 IF F(I)<>1 THEN 3130
3120 IF B(I)<1.00000E-04 THEN 3150
3130 NEXT I
3140 GO TO 9999
3150 F(I)=-1
3200 B=1.00000E+25
3210 FOR L=1 TO N
3220 IF F(L)<>0 THEN 3310
3230 F(L)=1
3240 GOSUB 5000
3250 IF W(1)>=B THEN 3300
3260 B=W(1)
3270 FOR I=1 TO N
3280 M(I)=F(I)
3290 NEXT I
3300 F(L)=0
3310 NEXT L
3320 GO TO 2500
5000 REM
5001 REM ---- SIMULATE ENTIRE CUTTING TO PREDICT TOTAL WASTE
5002 REM      (SUBROUTINE)
5003 REM
5010 Z=Z+1
5030 A(Z)=1.00000E+25
5040 FOR I=1 TO N
5050 IF F(I)<>1 THEN 5080
5060 IF B(I)>=A(Z) THEN 5080
5070 A(Z)=B(I)
5080 NEXT I
5100 FOR I=1 TO N
```

```
5110 IF F(I)<>1 THEN 5150
5120 B(I)=B(I)-A(Z)
5130 IF B(I)>1.00000E-04 THEN 5150
5140 C(Z)=I
5150 NEXT I
5300 F(C(Z))=-1
5310 FOR I=1 TO N
5320 IF F(I)=0 THEN 5500
5330 NEXT I
5340 FOR I=1 TO N
5350 IF F(I)=1 THEN 5400
5360 NEXT I
5370 GO TO 5900
5400 GOSUB 5000
5410 GO TO 5900
5500 R(Z)=1
5510 W(Z)=1.00000E+25
5520 IF F(R(Z))<>0 THEN 5570
5530 IF(R(Z))=1
5540 GOSUB 5000
5545 F(R(Z))=0
5550 IF W(Z+1)>=W(Z) THEN 5570
5560 W(Z)=W(Z+1)
5570 R(Z)=R(Z)+1
5580 IF R(Z)<=N THEN 5520
5590 W(Z+1)=W(Z)
5900 F(C(Z))=1
5910 FOR I=1 TO N
5920 IF F(I)<>1 THEN 5940
5930 F(I)=F(I)+A(Z)
5940 NEXT I
5950 GOSUB 7000
5960 W(Z)=W*A(Z)+W(Z+1)
5970 Z=Z-1
5980 RETURN
7000 REM
7001 REM ---- CALCULATE WASTE FACTOR FOR CURRENT GAUGE
7002 REM       (SUBROUTINE)
7003 REM
7010 FOR J=0 TO 960
7020 Z(J)=0
7030 NEXT J
7040 FOR I=1 TO N
7050 IF F(I)<>1 THEN 7080
7060 Z(L(I))=V(I)
7070 Z(L(I)+1)=V(I)
7080 NEXT I
7100 FOR I=1 TO N
7110 IF F(I)<>1 THEN 7160
7120 FOR J=L(I)+2 TO 960
7130 IF V(I)+Z(J-L(I)-2)<=Z(J) THEN 7150
7140 Z(J)=V(I)+Z(J-L(I)-2)
7150 NEXT J
7160 NEXT I
7200 W=0
7210 W0=0
7220 FOR J=1 TO 960
7230 IF Z(J)=Z(W0) THEN 7350
7340 W0=J
7350 W=W+(J-W0)*(Y(J-1)-Y(J))
7360 NEXT J
7370 W=W/(Y(0)-Y(960))
7380 RETURN
8000 REM
8001 REM ---- GENERATE ALL COMBINATIONS OF N LENGTHS
8002 REM       (SUBROUTINE)
8003 REM
8010 FOR I=1 TO N
8020 IF F(I)=0 THEN 8100
8030 F(I)=0
8040 NEXT I
8050 GO TO 8200
8100 F(I)=1
8200 N1=0
8210 FOR I=1 TO N
8220 IF F(I)<>1 THEN 8240
8230 N1=N1+1
8240 NEXT I
8250 RETURN
9999 END
```

Initially, the following data establishes the problem parameters:
1. The cutting bill consisting of:
   a. the length of each of the N parts,
   b. the board footage needed of each of the N parts, and
   c. the priority factor of each of the N parts;
2. the grade mix of lumber to be used;
3. statistical data describing the occurrence of clear areas of each length in each of the grades of lumber being considered; and
4. the number of lengths to cut at one time, X.

Grade mix data is statistical data representing the yield of usable lengths in the various grades of stock included in the grade mix being processed. If hardwood lumber is being processed, it is sold by quality grades which are defined by the National Hardwood Lumber Association and include the grades of FAS (first and second), Select, 1 Common and 2 Common. There are significant differences between grades relative to the cost of the lumber and relative to the number of different usable lengths which can be obtained from each grade. Where lumber is being processed, the data representing grade mix includes the probable number of board feet of each particular length of lumber available from a unit of lumber being processed. For example, the data may show that 250 board feet of 36 inch long usable boards can be cut per 1,000 board feet for Select grade lumber.

A value factor is computed for each part by dividing the length of the part by the probability of occurrence of this length in the grade mix being processed and this quotient is multiplied by the priority factor of the desired part. The priority factor is an arbitrary factor which permits the operator to increase the probability of cutting a desired length if pieces of that length are needed.

Each possible combination of "X" lengths chosen from the "N" lengths in the cutting bill is considered. The WASTE subroutine, shown in FIG. 2 and to be discussed hereafter, predicts the total waste of the entire cutting sequence resulting from the initial selection of each combination. Only the combination resulting in the lowest waste for the entire cutting sequence is retained. This lowest waste combination becomes the initial selection which the rough-mill operator utilizes and proceeds with cutting the lumber.

As soon as the board footage required for any one of the parts has been satisfied, the rough-mill operator inputs the board footage which has been cut of each part and updates the cutting bill to match the actual quantities required. The part requirement which has just been satisfied is removed from the selection.

Each possible replacement for the completed part is then considered. For each possible replacement, the WASTE routine, shown in FIG. 2, predicts the total waste for the entire cutting. The selection which results in the lowest waste for the entire cutting is retained and used by the rough-mill operator to make the next sequence of cuts. This process is repeated until the entire cutting bill has been satisfied.

The WASTE subroutine which predicts the total waste of usable lumber resulting from completing a cutting bill includes the following steps.

The part with the lowest board footage requirement is predicted as the first to be completed and is removed from the selection. This part is marked as completed and the board footage of each other part in the selection is then decremented by the board footage requirement of the part which was removed and marked as completed. This procedure simulates the cutting process.

Any part which is not being cut and has not been completed, is considered as a replacement for the completed part. For each possible replacement, the total waste is determined for the remainder of the cutting list using each of the parts, which are not being cut and have not been completed, as replacement. The lowest total waste value is retained as it is the total waste for the remainder of the cutting.

When there are no possible replacements, the cutting continues with one less length. If there are still parts in the selection which have not been completed, the total waste to finish cutting these parts is predicted by the WASTE subroutine. This predicted waste is the total waste for the remainder of the cutting. If all parts have been completed, then the total waste for the remainder of the cutting is obviously zero.

After the waste for the remainder of the cutting has been determined, the cutting bill is restored to the values prior to entering the WASTE subroutine. The waste for this portion of the cutting is then calculated on the basis of the board footage of the removed part multiplied by the waste factor determined for this selection by the GAUGE subroutine to be discussed hereafter.

The waste for this portion of the cutting is added to the waste for the remainder of the cutting to determine the total waste value.

The GAUGE subroutine permits calculation of the average waste factor for a combination of lengths wherein the waste factor is the average length of clear lumber which is not utilized.

All of the combinations of lengths in the selection which are less than the maximum length of clear lumber are considered. Combinations having a higher value than combinations of the same length are retained. This process is described in detail in the U.S. Pat. No. 4,017,796.

Next, for each possible length of lumber, the waste created by cutting the best combination is multiplied by the probability of occurrence of that length to determine an expected waste. These expected wastes are summed over the entire range of possible lengths of clear areas to determine the waste factor. This waste factor is then utilized by the main program to determine the best selection of parts to be cut.

From the foregoing detailed description, it will be evident that there are a number of changes, adaptations and modifications of the present invention which come within the province of those skilled in the art. However, it is intended that all such variations not departing from the spirit of the invention be considered as within the scope thereof and as limited solely by the appended claims. I claim:

1. A method for the cutting of elongated stock from a grade mix of stock being processed such as boards of lumber having randomly located unusable lengths, containing knots, discoloration or the like, to minimize waste, said method comprising: establishing the required lengths and the board footage and quantities of pieces of each length to be cut, determining and storing the grade mix of stock, establishing the probability of having a given length of usable stock in each of the grades of stock being processed, determining a value factor for each desired length based on the desired length and the probability of the occurrence of the desired length, determining the number x of lengths to be cut at one time, and for each combination of x lengths determining the least possible waste for the entire cutting starting with this selection to determine the combination of parts to be cut at one time which results in the lowest waste for the entire cutting and cutting the elongated stock using the determined combination of parts which results in the lowest waste for the entire cutting until the requirement for the established quantity for one required length has been reached.

2. The method of claim 1 including the additional step of determining and storing a priority factor for each desired length and wherein the value factor is additionally based on the priority factor.

* * * * *